UNITED STATES PATENT OFFICE.

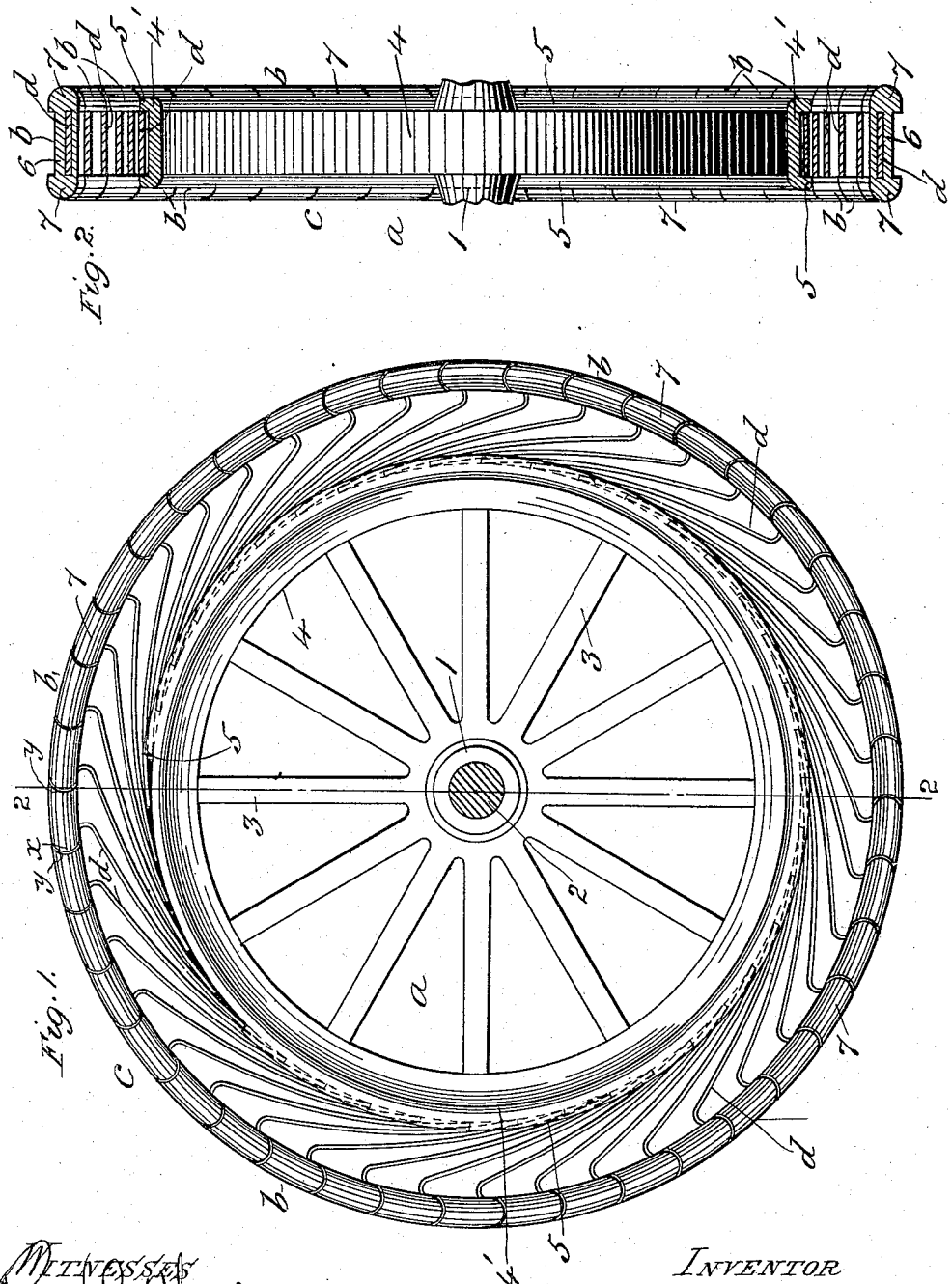

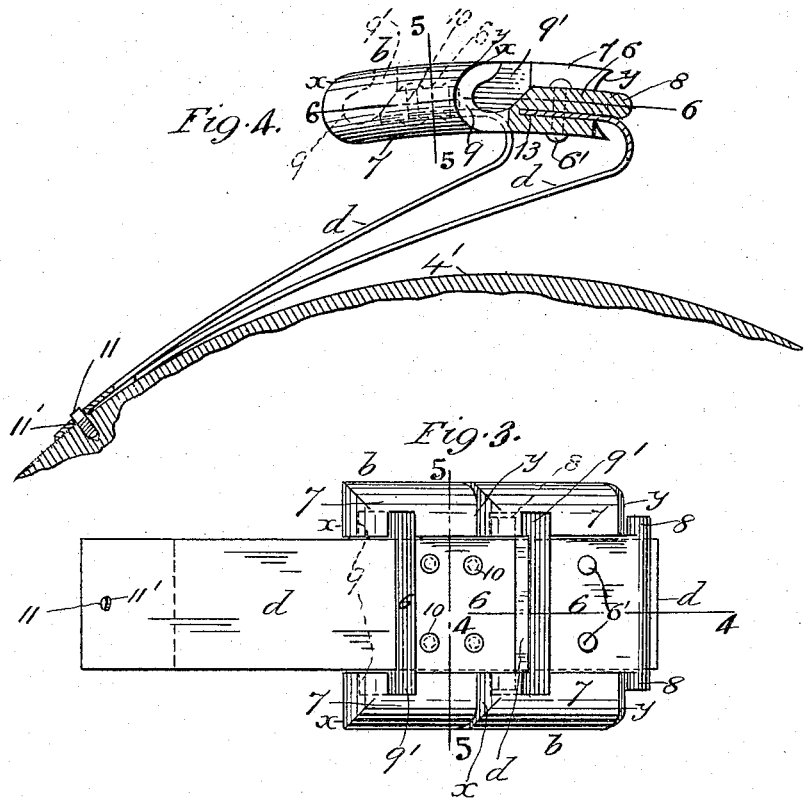

AVERY W. GANO, OF CARROLLTON, ILLINOIS.

VEHICLE WHEEL-TIRE.

1,154,504. Specification of Letters Patent. Patented Sept. 21, 1915.

Application filed January 20, 1913. Serial No. 743,137.

*To all whom it may concern:*

Be it known that I, AVERY W. GANO, a citizen of the United States, residing at Carrollton, in the county of Greene and State of Illinois, have invented a new and useful Improvement in Vehicle Wheel-Tires, of which the following is a specification.

My invention relates particularly to a metallic tire for a vehicle wheel, and is especially applicable to the wheel of an automobile which is subjected to sudden violent shocks causing, when having an ordinary pneumatic tire, breakage or undue straining of the felly and spokes of the wheel and irregular yielding and puncture of the tire.

My invention has for its object to minimize these defects by providing a tire in which puncturing is eliminated and uniform yielding combined with strength, stability, and durability obtained.

A further object of the invention is to construct a tire of a plurality of hingedly connected members having a spring attached thereto and arranged tangentially thereof, whereby the said tire may be arranged to have its springs engage with the flanged rim of a wheel and secured thereon in adjusted position by the application or removal of certain of the elements comprising the tire.

It consists in features of novelty as hereinafter described and claimed, reference being had to the accompanying drawing forming part of this specification.

Figure 1 is a side elevation of a wheel provided with my improvement, Fig. 2 is a sectional view through the same, approximately on the line 2—2 of Fig. 1, Fig. 3 is a top plan view of one of the sections of the tread with the spring attached thereto, and Fig. 4 is a sectional view approximately on the line 4—4 of Fig. 3.

In the drawings, $a$ designates a vehicle wheel, 1 the hub thereof, 2 the axle journaled in the hub, 3 the spokes, 4 the rim or felly and 4′ the side flanges formed with the rim 4.

The rim 4 and its flange 4′ constitute the felly of the wheel. The tread which surrounds the rim of the wheel is constructed of a plurality of similar links $b$, and each of said links includes an arched member having a central web 6 and side members 7. One end of each of the sides 7 is of a convex formation and projects a suitable distance beyond the end of the web, and the said projecting sides have their inner faces formed with circular slots 9 having entrance passages 9′ that open to the outer face of each of said links. The sides 7 have their opposite ends concaved, as indicated by the character Y and the webs project beyond the said concaved portions and are provided with laterally extending members 8 forming trunnions which are adapted to be received in one of the slots 9 after having been passed through the passage 9′ which communicates with the said slots. The webs are slotted approximately centrally and longitudinally to provide pockets 13 which receive one of the ends of spring members $d$, and the said spring members have their opposite ends resting against the rim 4 and between the side members or flanges 4′ thereof. The ends of the spring are held in the pockets by bolts or rivets 6′.

Having thus described the invention, what I claim is:

In combination with a wheel, of a tread surrounding the rim of the wheel, said tread comprising a plurality of similar links, each of said links including an arched member comprising a central web and sides formed with the web, the said sides having one of their ends projecting beyond the web and having the inner faces thereof formed with angular slots that open to the outer face of said link, the web extending beyond the opposite ends of the sides and having its end provided with lateral trunnions to be received within the slots in the projecting sides of the co-acting ends of the said links, each of said links having a longitudinally disposed pocket arranged below its trunnion, a spring member received within the pocket and secured to the link, and the said spring having its free end engaging with the rim of the wheel.

AVERY W. GANO.

Witnesses:
 REED P. THOMPSON,
 HAL C. BELLVILLE.

Copies of this patent may be obtained for five cents each, by addressing the "Commissioner of Patents, Washington, D. C."